(No Model.)
J. DOTY.
COVER FOR KETTLES, &c.
No. 485,095. Patented Oct. 25, 1892.
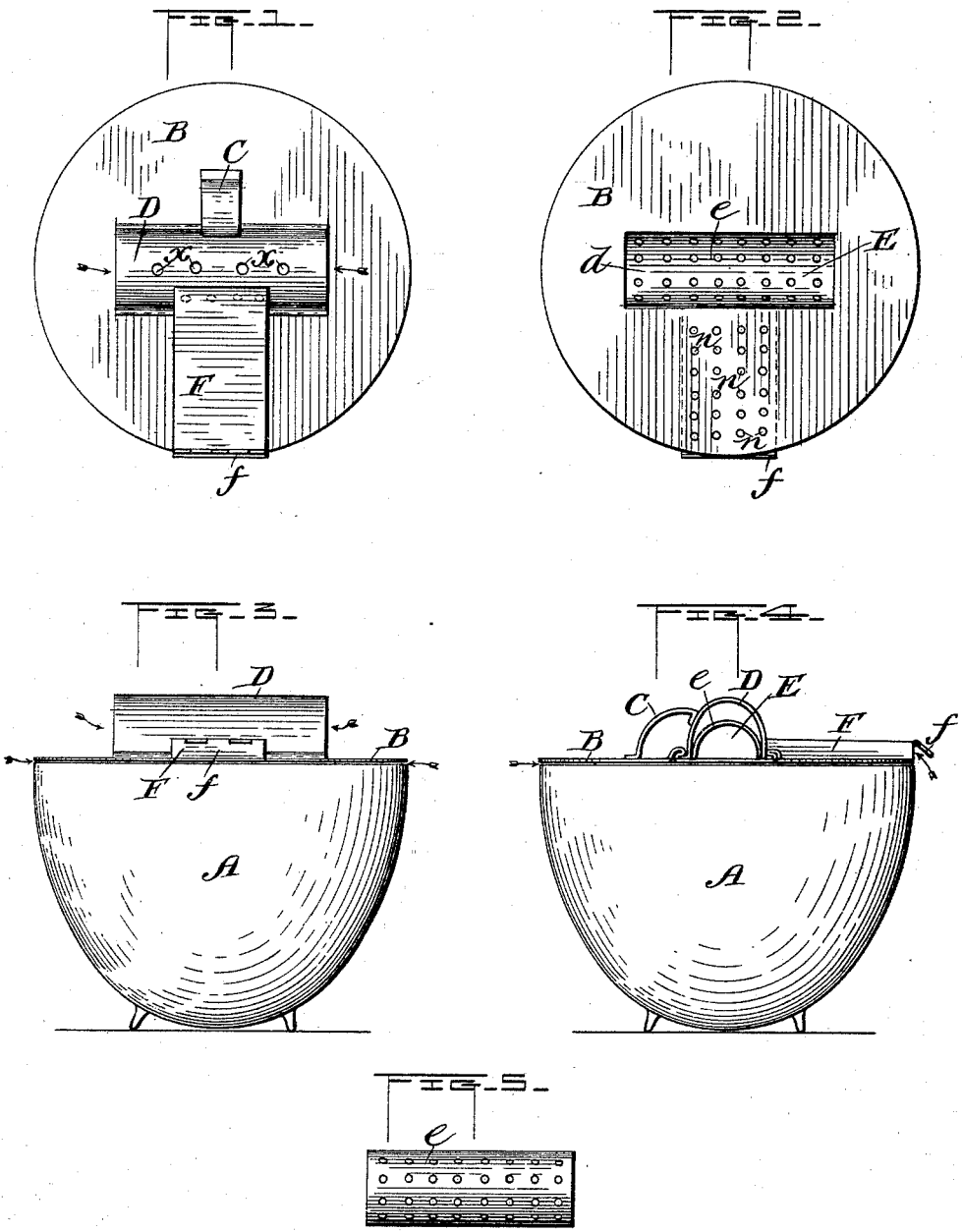

UNITED STATES PATENT OFFICE.

JAMES DOTY, OF MARION, WISCONSIN, ASSIGNOR OF ONE-HALF TO AUGUST TROSSEN AND AMBROSE S. McDONALD, OF SAME PLACE.

COVER FOR KETTLES, &c.

SPECIFICATION forming part of Letters Patent No. 485,095, dated October 25, 1892.

Application filed March 3, 1892. Serial No. 423,640. (No model.)

*To all whom it may concern:*

Be it known that I, JAMES DOTY, a citizen of the United States, residing at Marion, in the county of Waupaca and State of Wisconsin, have invented certain new and useful Improvements in Covers for Kettles and the Like; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved cover for kettles and the like; and the objects of my invention are, first, to prevent the contents of the kettle from boiling over; second, to condense the steam and return it to the kettle, and, third, to provide an improved water-way or drain for pouring off the water. I also construct the parts separable for the purpose of readily cleaning same.

In the accompanying drawings, Figure 1 is a top view; Fig. 2, a bottom view; Fig. 3, a side view; Fig. 4, an end view of the cover. Fig. 5 is a top view of the condenser.

Similar letters refer to similar parts throughout the several views.

A is the kettle, B the cover, and C the handle thereto.

D is a hood covering an opening $d$ in the cover and forming a horizontal duct E, into which the steam is drawn and condensed. Air is drawn in around the kettle between the cover and the top and becomes heated. The vapor-laden air passes upward through the opening $d$ and strikes against the top of the hood D, which condenses the vapor and it drops back into the kettle. Air from each side of the duct is also circulated, as indicated by the arrows, to aid in the condensation. For this purpose, also, a perforated circular plate $e$ may be placed within the duct, which assists in breaking up the currents of air and steam and condensing the latter. Should the cover fit too closely to the top of the kettle to admit sufficient air, an auxiliary supply-duct F is provided leading to the duct D, and closed, when desired, at the outside end by the hinged door $f$. This duct F covers the perforations $n\ n\ n\ n$ in the cover, and performs the double function of a water-way or drain for draining the water from the kettle and an auxiliary condenser, as before stated. The hood D is connected with the cover by a double seam, so as to slide laterally to remove it for cleaning purposes. The condenser $e$ is held in position by the hood D and is removable therewith.

I construct a form of my invention simply with the hood D covering the opening $d$ in the cover and without the perforations $x\ x\ x\ x$. With this the purposes specified are accomplished; but the addition of the condenser $e$ and the auxiliary draft-tube F are of additional benefit and advantage.

The door or cover $f$ is hinged loosely, so that when the kettle is tipped down for drainage it will open automatically.

Having thus described my invention, what I claim, and desire to secure by Letters Patent, is—

1. A cover for kettles, provided with a central opening covered by a hood having openings at each end and a perforated top, substantially as shown.

2. A cover for kettles, provided with a central opening covered by a cylindrical hood having openings at each end and inclosing a perforated condensing-plate, substantially as described.

3. A cover for kettles, having perforations near the edge leading to an air-supplying duct connected with a hood covering a central opening in the cover and provided with lateral openings, substantially as described.

In testimony whereof I affix my signature in presence of two witnesses.

JAMES DOTY.

Witnesses:
EDWIN CLIFFORD,
CHARLES J. SCHMIDT.